(12) United States Patent
Hähnsen et al.

(10) Patent No.: US 6,887,968 B2
(45) Date of Patent: May 3, 2005

(54) PROCESS FOR THE RECYCLING OF POLYCARBONATES

(75) Inventors: Heinrich Hähnsen, Duisburg (DE); Uwe Hucks, Alpen (DE); Silke Kratschmer, Krefeld (DE); Manfred Schraut, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 42 days.

(21) Appl. No.: 10/229,787

(22) Filed: Aug. 28, 2002

(65) Prior Publication Data

US 2003/0065130 A1 Apr. 3, 2003

(30) Foreign Application Priority Data

Aug. 31, 2001 (DE) .......................................... 101 42 735

(51) Int. Cl.$^7$ ............................................... C08G 64/00
(52) U.S. Cl. .................... 528/196; 264/176.1; 264/219; 525/461; 526/59; 528/198
(58) Field of Search .............................. 264/176.1, 219; 525/461; 526/59; 528/196, 198

(56) References Cited

U.S. PATENT DOCUMENTS

| | | | |
|---|---|---|---|
| 5,373,082 A | 12/1994 | Kauth et al. | 528/196 |
| 5,652,275 A | 7/1997 | Buysch et al. | 521/48 |
| 5,864,006 A * | 1/1999 | Ormand et al. | 528/196 |
| 6,028,129 A | 2/2000 | Pfaendner et al. | 524/99 |
| 2003/0229197 A1 * | 12/2003 | Inoue et al. | 528/86 |
| 2003/0232957 A1 * | 12/2003 | Silvi et al. | 528/86 |

FOREIGN PATENT DOCUMENTS

| | | |
|---|---|---|
| DE | 43 26 906 | 2/1995 |
| DE | 199 33 132 | 1/2001 |

* cited by examiner

*Primary Examiner*—Terressa Boykin
(74) *Attorney, Agent, or Firm*—Joseph C. Gil; Aron Preis

(57) ABSTRACT

A process for making a high molecular weight (co) polycarbonate resin is disclosed. The process entails (i) obtaining at least one member selected from the group low molecular weight residue (weight average molecular weight 15,000 to 30,000) of aromatic (co)polycarbonate production, waste of (co)polycarbonate production, remainders of (co) polycarbonate production and (co)polycarbonate recyclate (ii) melting the said member in a suitable vessel to obtain a melt and (iii) feeding the melt into a reactor optionally along with at least one bisphenol or oligocarbonate having terminal OH groups and further optionally with a transesterification catalyst, and (iv) subjecting the melt to transesterification reaction at a temperature of 250 to 350° C., at a pressure below 5 mbar and residence time of 0.02–4 hours.

13 Claims, No Drawings

PROCESS FOR THE RECYCLING OF POLYCARBONATES

FIELD OF THE INVENTION

The present invention relates to recycling of polycarbonates and more particularly to a process for the modifying low-molecular polycarbonate residues and production wastes to produce utilizable materials.

SUMMARY OF THE INVENTION

A process for making a high molecular weight (co)polycarbonate resin is disclosed. The process entails (i) obtaining at least one member selected from the group low molecular weight residue (weight average molecular weight 15,000 to 30,000) of aromatic (co)polycarbonate production, waste of (co)polycarbonate production, remainders of (co)polycarbonate production and (co)polycarbonate recyclate (ii) melting the said member in a suitable vessel to obtain a melt and (iii) feeding the melt into a reactor optionally along with at least one bisphenol or oligocarbonate having terminal OH groups and further optionally with a transesterification catalyst, and (iv) subjecting the melt to transesterification reaction at a temperature of 250 to 350° C., at a pressure below 5 mbar and residence time of 0.02–4 hours.

BACKGROUND OF THE INVENTION

Polycarbonates, for example from bisphenol A, are mostly amorphous technical thermoplastics with high-quality properties, such as e.g. high transparency, thermal resistance and toughness. The same applies also to aromatic copolycarbonates that are built up, for example, from bisphenol A and a cobisphenol. The production costs of such materials and the level of their properties thus also justify more demanding recycling processes, if old molded parts or production scrap are to be sent for ecologically-necessary and economically-reasonable recyling. The divide between processing costs and economy is considerably more beneficial for aromatic polycarbonates than for many other thermoplastics, so that processes consisting of more than one process step are definitely also worthwhile. However, efforts are always being made to find processes that are simpler and more economic than the known processes, in order to be able to produce more cheaply.

As with other thermoplastics, the level of mechanical and physical properties of polycarbonate depends on the molecular weight. However, production waste, recyclates etc. frequently do not, or no longer, possess the required molecular weights. Direct material recycling of production waste or recyclates is therefore possible only to a very limited extent.

When recycling polycarbonate residues, production wastes, remainders, recyclates and similar polycarbonate compositions, it is therefore desirable and essential to increase the molecular weight to a sufficient level for the projected new use. So, for example, low-molecular production scrap from PC production for Compact Discs could be increased to the molecular weight range required for injection molding. Or the average molecular weight of PC recyclate from the de-lamination of Compact Discs should be increased sufficiently to allow the material to be used, e.g,. as a component in the production of PC/ABS blends.

There is little reference in the literature to condensation of polycarbonate molding compositions destined for chemical-material recycling. Thus EP-A 931 810 discloses a process for increasing the molecular weight of decomposed low-molecular polycondensates such as polyamides, polyesters and polycarbonates using reactive chain lengtheners. These chain lengtheners react in the plastic melt, e.g, in an extruder, under conventional compounding conditions, with the functional chain ends of the polymer. Special bisepoxides are mentioned as chain lengtheners, alone or in combination with epoxides, bisoxazolines, dicyahates, tetracarboxylic acid dianhydrides, bismaleic imides and carbodiimides amongst others. However, no example is given for the function of the process with polycarbonate. The disclosed trials showed no increase in the molecular weight of polycarbonate using the process disclosed in EP-A 931 810.

DE-PS 43 26 906 provides a process for the chemical recycling of polycarbonate by transesterification with hydroxy compounds, in particular phenol, until bisphenol is obtained and the esterified carbonate unit, followed by resynthesis of polycarbonate in the melt. Although this process produces bisphenol and the carbonate unit, the polycarbonate is then completely decomposed by transesterification. In addition to the decomposition of useful bonds, which must then be built up again, the process method is also complex and expensive.

DE-OS 42 40 314 differs from the above patent specification substantially by prior decomposition of the polycarbonate to oligomers, by transesterification with low-boiling monophenols. Then a higher-viscosity oligomer with a particular content of OH terminal groups is produced first from the decomposition product and optionally added diarylcarbonate by recondensation with the splitting off of the monophenol, which, in the final stage, is then polycondensed in the melt under more rigorous reaction conditions to form the desired polycarbonate. Here too the polycarbonate is first decomposed, which necessitates an additional process step. A further disadvantage is that oligomers with OH terminal groups are significantly more susceptible to thermal and oxidative loading than the corresponding polymers and rapidly become discoloured and damaged. The condensation process is therefore sensitive and must be subjected to complex controls to achieve a precise reaction that minimizes such effects.

Finally, DE-OS 44 21 701 discloses a process for the chemical recycling of polycarbonates by decomposition with diaryl carbonates to form oligomers. After they have been crystallised in a particular solvent, cleaned and dried, these are re-condensed to form polycarbonate, optionally with the addition of bisphenols and a catalyst. The disadvantages of this recycling process are the same as those of the processes according to DE-PS 43 26 906 and DE-OS 42 40 314, described above.

On the basis of this prior art, the object was therefore to provide a process by which the molecular weight of polycarbonates may be increased as simply and efficiently as possible.

DETAILED DESCRIPTION OF THE INVENTION

It was found that, surprisingly, it is possible to condense polycarbonates by simple melting in a vacuum, optionally with bisphenols or suitable oligocarbonates with OH terminal groups, to produce, directly, polycarbonates of higher molecular weights.

The present invention thus relates to processes for the condensation of polycarbonate, characterised in that polycarbonates may be condensed in the melt, usefully with the addition of bisphenols or oligocarbonates with OH terminal groups to accelerate the reaction, optionally using catalysts to obtain polycarbonates, which have a higher molecular weight than the starting polycarbonate.

In the process according to the invention, the polycarbonate to be condensed, preferably bisphenol A-polycarbonate, as a granulate or ground PC moulded parts, is melted in a suitable vessel and then condensed in a reactor operating batch-wise or continuously. Critical values for the reaction parameters for this are pressure, temperature and residence time. The condensation may be carried out in the presence of one or more catalysts.

The reaction parameter ranges are 0.01 to 5 mbar, preferably 0.1 to 2 mbar, 250–350° C. melting temperature, preferably 280–320° C. The average residence time depends on the reaction vessel and is 0.01 to 0.3 hours for screw-type extruders and 0.2 to 4 hours for agitated tanks, kneading apparatus and disk or basket reactors. When using disk or basket reactors, residence times of 0.5 to 2 hours are preferred.

With discontinuous processes, pressure and temperature may be varied in accordance with different schedules. Continuous processes are normally run constantly under the suitable temperature and pressure conditions, pressure and temperature profiles being set along the length of the reactor.

Embodiments preferred, preferred in particular or most particularly preferred are those in which the parameters, definitions and explanations stated under preferred, preferred in particular or most particularly preferred, are used.

However, the general definitions, parameters or explanations, or those listed in preferred ranges, given above and below may be combined arbitrarily with each other, i.e,. between the particular ranges and preferred ranges.

The polycarbonate used either already has an average concentration of phenolic terminal groups of over 100 ppm OH, preferably 100–1500 ppm, in particular 400–1000 ppm, or this is adjusted in the melt by adding a bisphenol, preferably bisphenol A, or oligocarbonates having terminal OH groups. When converting in the melt to higher molecular weights, volatile portions that are split off are discharged from the reactor as vapors. The small quantities arising here are sluiced out of the process by suitable means, which simplifies the process considerably.

Condensation may be carried out in agitated tanks, screw- or kneading apparatus, extruders, disk or basket reactors and in combinations of such apparatus. For continuous processes, extruders or basket or disk reactors, in particular basket or disk reactors are preferred, as disclosed in DE Appl. No. 1 011 98 51 or DE-C2 44 47 422. Basket or disk reactors are also suitable for discontinuous processing.

Condensation may be accelerated by carrying it out in the presence of a condensation catalyst. Suitable catalysts and the concentrations in which to use them may be taken from the literature (Chemistry and Physics of Polycarbonates, Polymer Reviews, H. Schnell, Vol. 9, Pages 44–51, John Wiley & Sons, 1964; DE-PS 1 031 512; EP-A 360 578; EP-A 351 168; U.S. Pat. No. 3,442,854).

Alkali- or earth alkali compounds with an alkaline action and ammonium- or phosphonium salts, hereinafter described as onium salts, are preferred.

Phosphonium salts according to the invention are those of the formula (IV),

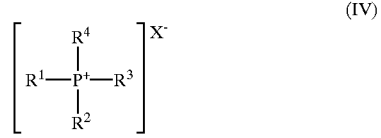

(IV)

wherein $R^{1-4}$ independently one of the others may be $C_1$–$C_{10}$-alkyls, $C_6$–$C_{10}$-aryls, $C_7$–$C_{10}$-aralkyls or $C_5$–$C_6$-cycloalkyls, preferably methyl or $C_6$–$C_{14}$-aryls, in particular methyl or phenyl, and $X^-$ may be an anion such as hydroxide, sulfate, hydrogen sulfate, hydrogen carbonate, carbonate, a halogenide, preferably chloride, or an alcoholate of the formula OR, wherein R may be $C_6$–$C_{14}$-aryl or $C_7$–$C_{12}$-aralkyl, preferably phenyl.

Preferred catalysts are
tetraphenylphosphonium chloride
tetraphenylphosphonium hydroxide
tetraphenylphosphonium phenolate
in particular tetraphenylphosphonium phenolate.

Further preferred catalysts, which may be used alone or optionally in addition to an onium salt, are compounds of alkali metals and earth alkali metals with an alkaline action, such as hydroxides, alkoxides and aryloxides of lithium, sodium, potassium, magnesium and calcium, preferably of sodium. Sodium hydroxide and sodium phenolate and the sodium bisphenolate of bisphenol A are most preferred.

The polycarbonate is introduced into the condensing reactor preferably via a screw. If bisphenols or oligomers with OH terminal groups are added to increase the concentration of OH terminal groups, the screw serves as a mixing unit as well. A melting screen with or without a backwashing device may be positioned between the screw and the condensing reactor, to avoid contaminant particles having sizes that are ≧5 μm from the highly fluid melt. The melt flowing from the condensing reactor after polycondensation is discharged by means of a gear pump. Here the melt may be fed over static mixers or extruders and mixed with additives to set special formulations of the polycarbonates produced before being fed on for granulation.

Suitable additives are disclosed e.g. in WO 99/55772, pg. 15–25, DE Appl. No.10122496.6 and in "Plastics Additives", R. Gätchter and H. Müller, Hanser Publishers 1983. In principle, additives may be added at any point in the reaction, preferably before granulation.

Any bisphenol or an oligocarbonate having OH terminal groups may optionally be added to the polycarbonate to be condensed. The bisphenol or the OH-containing oligocarbonate on which the polycarbonate to be condensed is based, are preferred.

The dosage, in terms of parts by weight, of the bisphenol or the oligocarbonate in relation to the weight of polycarbonate used is in the range 0:100 to 10:100, preferably 0.1:100 to 5:100, in particular 0.2:100 to 1:100 for the bisphenol and in the range 0:100 to 50:100, preferably 0.5:100 to 30:100, in particular 1:100 to 10:100 for the oligocarbonate.

Examples of bisphenols that may be used according to the invention or may also form the basis of the polycarbonate to be condensed may be found in WO-A1 01/05866, pg. 6–8. 4,4'-dihydroxybiphenyl, 4,4'-dihydroxydiphenyl sulphide, 2,2-bis-(4-hydroxyphenyl)-propane (bisphenol A), 2,2-bis-(3-methyl-4-hydroxyphenyl)-propane, 2,2-bis-(3,5-dimethyl-4-hydroxyphenyl)-propane, 2,2-bis-(4-hydroxyphenyl)-methane, 2,2-bis-(3,5-dimethyl-4-hydroxyphenyl)-methane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-chloro-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(p-hydroxyphenyl)-3,3,5-trimethylcyclohexane are preferred. Diphenols preferred in particular are 4,4'-dihydroxybiphenyl, 2,2-bis-(4-hydroxyphenyl)-propane (bisphenol A) and 1,1-bis-(p-hydroxyphenyl)-3,3,5-trimethylcyclohexane. 2,2-bis-(4-hydroxyphenyl)-propane (bisphenol A) and 1,1-bis-(p- hydroxyphenyl)-3,3,5-trimethylcyclohexane are preferred most particularly, in particular 2,2-bis-(4-hydroxyphenyl)-propane (bisphenol A). Accordingly the oligomers obtained from these bisphenols may also be used according to the invention.

The polycarbonate used has a weight average molecular weight ($M_w$) of 15,000 to 30,000, preferably 16,000 to 25,000, in particular 17,000 to 22,000, determined by measuring the relative solution viscosity in dichloromethane, calibrated by light scattering. A PC recyclate is preferred, in particular a PC recyclate from Compact Discs.

The polycarbonates and copolycarbonates used may originate from the known interfacial or melt transesterification process and may therefore contain different chain stoppers.

Phenol, octylphenol, cumylphenol and t-butylphenol are suitable chain stoppers. Other typical chain stoppers for polycarbonate may be taken from WO-A1 01/05866, pg. 4–6. There may also be mixtures of chain stoppers, e.g., via the mixing of different polycarbonates. Polycarbonates from the melt transesterification process preferably have the phenol of the diphenylcarbonate used for production as a chain stopper.

Single polycarbonate or a mixture of various polycarbonates may be condensed. The polycarbonates may differ with regard to their average molecular weight, the bisphenol used and/or the chain stopper, branching agent etc., used. Furthermore, the polycarbonates may contain chain branching agents such as are disclosed in WO-A1 01/05866, pg. 8–9. Mixtures of polycarbonates, which are built up of the same bisphenol, in particular bisphenol A, are preferred.

Mixtures occur in particular when the PC recyclates from consumption waste and process scrap to be condensed are not of the same type.

The polycarbonates obtainable by the process according to the invention may be processed on conventional machinery, for example, extruders or injection molding machines, to produce any type of molded articles, for example, films or sheets, in the conventional manner.

Furthermore, the polycarbonates according to the invention may also be mixed into other polymers, e.g., polyolefins, polyurethanes, polyesters, ABS and polystyrene. These materials are added preferably on conventional machines for the processing of polycarbonate, but may also be added at another stage in the production process as required.

The invention also provides the polycarbonates obtainable by the process according to the invention themselves. They differ from primary material, in other words the known commercial material, by the presence of fluorescence-active centres, which fluoresce when irradiated with UV light, e.g., black light. This optical effect can be used, e.g., to aid plastic recognition in sorting processes for material recycling or to differentiate between a recyclate and a primary material.

Auxiliaries and reinforcing agents may be mixed into the polycarbonates according to the invention to change or improve certain properties. Thermal—and UV stabilizers, flowing agents, mold release agents, flame-retardants, hydrolysis stabilizers, finely comminuted minerals, fibers, e.g. alkyl- and arylphosphites, -phosphates, -phosphanes, low-molecular carboxylic acid esters, halogen compounds, salts, chalk, quartz powder, glass and carbon fibers, pigments, dyes and combinations thereof, amongst others, may be considered for this purpose. Such compounds are disclosed e.g. in WO 99/55772, pg. 15–25 and in "Plastics Additives", R. Gätchter and H. Müller, Hanser Publishers 1983.

These additives may be introduced into the melting and discharge screw or directly into the melting reactor, although the discharge unit is preferred.

The polycarbonates produced according to the invention may be used for many mechanically demanding applications. They are thus suitable for the production of molded articles and extrudates of the most varied character. Possible applications are Safety screens, which, as is known, are needed in many areas of buildings, vehicles and aircraft, and as visors for crash helmets, Films, in particular ski films Blown articles (see for example, U.S. Pat. No. 2,964,794), for example, 1 to 5 gallon water bottles, translucent sheets, in particular multi wall sheets, for example, for covering buildings such as stations, greenhouses and lighting installations, optical data storage units traffic signal housings or traffic signs foamed materials (see for example, DE-AS 1 031 507).

thread and wire (see for example, DE-AS 1 137 167 and DE-OS 1 785 137), translucent plastics with a glass fibre content for lighting purposes (see for example, DE-OS 1 554 020), translucent plastics containing barium sulfate, titanium dioxide and/or zirconium dioxide or organic polymeric acrylate rubbers (EP-A 634 445, EP-A 269324) for the production of translucent and light-diffusing molded parts small, precision injection-molded parts, such as, for example, lens mounts (polycarbonates containing glass fibres, which optionally also contain ca 1–10 wt. % $MoS_2$, in relation to the total weight, are used for this), optical instrument parts, in particular lenses for cameras and camcorders (see for example, DE-OS 2 701 173), light transmission media, in particular fiber-optic cables (see for example, EP-A1 0 089 801), electrical insulation materials for electrical conductors and for plug housings and pin-and-socket connectors, mobile telephone housings with improved resistance to perfume, after-shave and perspiration, network interface devices carrier materials for organic photoconductors, lights, e.g., headlamps, light-diffusing screens or internal lenses medical applications, e.g., oxygenators, dialyzers food applications, such as, e.g., bottles, cutlery and chocolate molds, applications in the automotive industry, where there may be contact with plastics and lubricants, such as, e.g., bumpers, optionally in the form of suitable blends with ABS or suitable rubbers, sports equipment such as, e.g., slalom poles or ski boot buckles, household articles such as, e.g., kitchen sinks and letter box housings, housings, such as, e.g., electrical distributor cases, housings for electric toothbrushes and hairdryer housings, transparent washing machines—portholes with better resistance to washing solution, protective goggles, vision-correcting spectacles, lamp covers for kitchen fittings with improved resistance to kitchen vapors, in particular, oil vapors, packaging films for medicines, chip boxes and chip carriers, as well as other applications such as e.g. stable doors or animal cages.

The following examples are intended to illustrate the object of the present invention without restricting it.

EXAMPLES

Example 1

Ground PC from the de-lamination of Compact Discs by the process described in EP-A 537 567 (pg. 1, 2, 5, 6) was dried in the circulating air dryer (2 h/120° C.) and then melted in a twin shaft screw ZSK 25 (Werner & Pfleiderer), and continuously fed into a basket reactor operating at 300° C. A mixture containing a portion of the total polycarbonate to be condensed and bisphenol A (the amount of bisphenol A being 0.25 wt. % relative to the total weight of polycarbonate to be condensed) was introduced into the melting screw. In all, the PC feed stream (containing polycarbonate and bisphenol A) via the feed screw was 20 kg/h. No condensation catalyst was used. The condensation reactor was a drum with a melt inlet and outlet at the ends and a vacuum connection in the gas (or vapor) space, that is the volume above the melt, in which a shaft with disks, which dipped into the melt, slowly rotated. The speed of rotation was 0.8 revolutions per minute; the average residence time of the melt was ca 180 minutes. The melt temperature was 300° C., the pressure in the gas space of the reactor was 0.7 to 0.8 mbar. The condensed melt was discharged via a gear pump with attached granulating unit. The properties of the PC granulate thus obtained and the starting material are summarised in Table 1.

TABLE 1

Condensation of recyclate in a disk reactor.

| Properties | Units | Start[1] A | Condensate[2] B (A + BPA) | C (A + BPA) |
|---|---|---|---|---|
| Mechanical | | | | |
| Elongation at break Impact strength | % | 3.5 | 82 | 91 |
| IZOD impact strength, RT | kJ/m² | 28 | n.b. | n.b. |
| IZOD notched impact strength, RT Content | kJ/m² | 8b 61t/17b | 67t | |
| Phenolic OH Flowability | ppm | 600 | 500 | 600 |
| MVR 300° C./1.2 kg | cm³/10 min | 65 | 16 | 23 |
| rel. solution viscosity | — | 1.202 | 1.271 | 1.248 |

[1]A: CD recyclate, recovered by de-laminating ground material from CDs
[2]B: A + 0.25 wt. % BPA, 310/300° C., 0.8 mbar, 180 min average residence time
C: A + 0.25 wt. % BPA, 300/290° C., 0.7 mbar, 180 min average residence time
b = brittle;
t = ductile;
n.b. = not broken

Example 2

Similarly, low-molecular PC granulate from production waste was condensed to produce a higher-molecular polycarbonate. Here Bisphenol A was used in example D and condensation catalyst were not used. The material properties are summarized in Table 2.

TABLE 2

Condensation of low-molecular PC granulate for the production of Compact Discs in a disk reactor

| Properties | Units | Start[1] D | Condensate[2] E (D + BPA) |
|---|---|---|---|
| Mechanical | | | |
| Elongation at break Impact strength | % | 60 | 100 |
| IZOD impact strength, RT | kJ/m² | 28 | n.b. |
| IZOD Notched impact strength, RT Content | kJ/m² | 10 | 60 |
| OH Flowability | ppm | 130 | 550 |
| MVR 300° C./1.2 kg | cm³/10 min | 71 | 40 |
| rel. solution viscosity | — | 1.195 | 1.223 |

[1]D: primary material granulate Makrolon DP 1-1265, a BPA-based homopolycarbonate, a product of Bayer.
[2]E: D + 0.25 wt. % BPA, 320/310° C., 0.75 mbar, 180 min average residence time

Example 3

Ground PC from the de-lamination of Compact Discs was condensed in an extruder. The extruder used was a twin shaft screw ZSK 32 (Werner & Pfleiderer) 1.4 m long with a 0.8 m long de-aerating dome, beginning 0.4 m along the screw length. Here too, melt condensation was carried out without the addition of a transesterification catalyst. Before being added the material was dried in a recirculating air dryer (2 h/120° C.). The results are summarized in Table 3.

TABLE 3

Condensation of Compact Disc-recyclate in a twin shaft screw (ZSK 32, Werner & Pfleiderer)

| Properties | Units | Start[1] F | Condensate[2] G (from F) |
|---|---|---|---|
| Mechanical | | | |
| Elongation at break Impact strength | % | 2.7 | 61 |
| IZOD impact strength, RT | kJ/m² | 11b | n.b. |
| IZOD Notched impact strength, RT Content | kJ/m² | 35b | n.b. |
| OH Flowability | ppm | 440 | 140 |
| MVR 300° C./1.2 kg | cm³/10 min | 82 | 18 |
| rel. solution viscosity | — | 1.202 | 1.255 |

TABLE 3-continued

Condensation of Compact Disc-recyclate in a twin shaft screw
(ZSK 32, Werner & Pfleiderer)

| Properties | Units | Start[1] F | Condensate[2] G (from F) |
|---|---|---|---|
| Condensation of another starting material (F') adding 0.25 wt. % BPA: | | | |
| OH content | ppm | 260 | 120 |
| rel. solution viscosity | — | 1.198 | 1.265 |

[1]F: CD recyclate, recovered from the de-lamination of ground material from CDs
[2]G: F melt condensed at 320–340° C., 0.5-1 mbar, 2 kg/h throughput, 100 rpm, 3–5 min average residence time
b = brittle;
n.b. = not broken Measuring Methods Elongation at break, modulus of elasticity to ISO 527; impact/notched impact strength to ISO 180/1C or ISO 180/4A; phenolic OH photometrically with $TiCl_4$ on the Ti complex; MVR to ISO 1133; rel. solution viscosity on PC solution in dichloromethane (5 g PC/l).

It is clear that with the process according to the invention, the molecular weight of low-molecular polycarbonates (A, D, F) may be condensed to attain highly-viscous polycarbonates (B, C, E, G) with better mechanical properties such as elongation at break and impact/notched impact strength.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A process for making a high molecular weight (co)polycarbonate resin comprising
    (i) obtaining at least one member selected from the group low molecular weight residue (weight average molecular weight 15,000 to 30,000) of aromatic (co)polycarbonate production, waste of (co)polycarbonate production, remainders of (co)polycarbonate production and (co)polycarbonate recyclate (ii) melting said at least one member in a suitable vessel to obtain a melt and (iii) feeding the melt into a suitable reactor operated batch-wise or continuously, optionally along with at least one bisphenol or oligocarbonate having terminal OH groups and further optionally with a transesterification catalyst, and (iv) subjecting the melt to transesterification reaction at a temperature of 250 to 350° C., at a pressure below 5 mbar and residence time of 0.02–4 hours, to obtain high molecular weight (co)polycarbonate resin.

2. The process according to claim 1, wherein temperature is 280 to 320° C.

3. The process according to claim 1, wherein said member is regulated as to its molecular weight with the conventional phenolic chain stoppers.

4. The process according to claim 1, wherein (iii) feeding the melt into a suitable reactor operated batch-wise or continuously is along with at least one bisphenol.

5. The process according to claim 1, wherein (iii) feeding the melt into a suitable reactor operated batch-wise or continuously is along with at least one oligocarbonate having terminal OH groups.

6. The process of claim 4 wherein the weight ratio of polycarbonate or copolycarbonate to bisphenol is between 100:0 and 100:10.

7. The process of claim 5 wherein the weight ratio of polycarbonate or copolycarbonate to oligocarbonate with OH terminal groups is between 100:0 and 100:50.

8. The process according to claim 1, wherein transesterification is carried out in the presence of a transesterification catalyst for polycarbonate.

9. The process according to claim 1, wherein more than one member is obtained in (i).

10. The high molecular weight (co)polycarbonate resin prepared by the process of claim 1.

11. A method of using the high molecular weight (co)polycarbonate of claim 10 comprising making a molded article.

12. A method of using the high molecular weight (co)polycarbonate of claim 10 comprising forming a blend with at least one thermoplastic resin other than polycarbonate.

13. A molded article comprising the high molecular weight (co)polycarbonate of claim 10.

* * * * *